US 8,412,578 B2

(12) United States Patent
Roberts (10) Patent No.: US 8,412,578 B2
(45) Date of Patent: Apr. 2, 2013

(54) SYSTEM FOR DELIVERING ADVERTISEMENTS TO WIRELESS COMMUNICATION DEVICES

(75) Inventor: Joseph Roberts, Grafton, NH (US)

(73) Assignee: Opportunity Notification Technology, LLC, Manchester, NH (US)

( * ) Notice: Subject to any disclaimer, the term of this patent is extended or adjusted under 35 U.S.C. 154(b) by 1408 days.

(21) Appl. No.: 12/002,459

(22) Filed: Dec. 17, 2007

(65) Prior Publication Data

US 2008/0215436 A1    Sep. 4, 2008

Related U.S. Application Data

(60) Provisional application No. 60/875,008, filed on Dec. 15, 2006.

(51) Int. Cl.
*G06Q 40/00* (2012.01)
(52) U.S. Cl. .......... 705/14.66; 705/7.29; 705/14.43; 705/26.5; 705/28
(58) Field of Classification Search ........... 705/14.66, 705/7.29, 14.43, 26.5, 28
See application file for complete search history.

(56) References Cited

U.S. PATENT DOCUMENTS

| 6,698,020 B1 * | 2/2004 | Zigmond et al. ........... 725/34 |
| 2001/0016483 A1 | 8/2001 | Nakajima |
| 2003/0032409 A1 | 2/2003 | Hutcheson et al. |
| 2004/0103024 A1 * | 5/2004 | Patel et al. ........... 705/14 |
| 2005/0239448 A1 | 10/2005 | Bayne |
| 2005/0286691 A1 | 12/2005 | Taylor et al. |

* cited by examiner

*Primary Examiner* — Daniel Felten
(74) *Attorney, Agent, or Firm* — Paul C. Remus; Devine, Millimet & Branch (57) ABSTRACT

An advertising system and method for a communication system that delivers advertisements to subscribers based on the respective subscriber data. The advertisers, through the provider of the system, have advertisements selected and delivered to the subscriber based on the subscriber data. The advertiser pays for advertisement delivery such that the provider can offer reduced rates or free communication services to the subscribers. The provider is capable through the system to update the subscriber data in real time including personal profile, purchase history, financial condition, and location. The provider through the system is capable of establishing advertisement delivery priority by evaluating the subscriber data in real time just prior to triggering advertisement delivery. The advertisement can be delivered in place of ring tones, at the end of the conversation, and while waiting for the other party to answer.

35 Claims, 8 Drawing Sheets

SYSTEM FOR DELIVERING ADVERTISEMENTS TO WIRELESS COMMUNICATION DEVICES

CROSS REFERENCE TO RELATED APPLICATIONS

The present application claims the benefit of Provisional Patent Application Ser. No. 60/875,008 filed Dec. 15, 2006, which is incorporated herein by reference.

TECHNICAL FIELD

The present invention relates to a system for delivering advertisements. More specifically, it relates to a system for delivering advertisements to a wireless communication device (a "WCD"), which term is used here to include any wireless devices by which an individual may receive cellular telephone calls, instant messages, or emails.

BACKGROUND OF THE INVENTION

Advertisers are always looking for new and better, i.e. more targeted methods, to advertise their products. For example, this search has lead to the proliferation of advertising on the Internet. It is a new advertising medium, and it offers a more targeted approach, in which search engines can present advertisements related to a given search and retailers can present advertisements related to previous purchases.

As this proliferation of advertisements continues, any one advertisement tends to be lost in the clutter. Moreover, individuals tend to ignore the advertisements or purchase software to block "pop-up" advertisements.

There are a number of examples in the prior art of methods for delivering advertisements to cell phones and other wireless devices. However, these methods suffer from a number of drawbacks. For example, some systems and methods require the user, or the user's device, to take action to receive an advertisement; do not provide any compensation to the user for listening to the advertisement; and do not provide targeted advertisements. In other methods the advertisements are delivered without a user taking action but in which no compensation is paid to the user for listening to the advertisement. In another method, the advertisements are delivered without the user taking any action and in which incentive is provided to the user to listen to the advertisement in the form of credits toward the cost of the network service based on the number of advertisements played. However, no targeted advertisements are provided.

SUMMARY

Unfortunately, there are deficiencies to the above advertisement systems including the lack of incentive and failure to target the advertisement to maximize the benefit for the advertiser and the subscriber. In addition, the prior art advertisement systems do not facilitate and coordinate the business and economic needs of subscribers, advertisers, and service providers, offering each the incentives necessary to justify their participation in the program.

In contrast to the above-described advertisement system, the system and method herein described gives the subscriber, through a profile and history, the ability to receive advertisements that anticipate both current and future needs. The subscriber therefore is more likely not to ignore the advertisements. The advertiser will therefore be able to better target their advertisements and receive a better return on their investment. The provider of the system and method is given the ability to increase revenues by accepting advertisements.

It is an object of the present invention to provide a new and improved system of delivering advertisements to a wireless communication device. It is another object of the present invention to provide a network service provider an opportunity to increase revenues both by increasing the use of its network and by selling time for advertisements. It is still another object of the present invention to provide advertisers with real time information to use to target individuals who may be more interested in a given advertisement than the population as a whole. It is still another object of the present invention to provide the user of a wireless communication device with advertisements without taking any action; the incentive of reduced cost of "air time;" intuitive advertisements that are targeted to anticipate the subscriber's desires; and an interactive service that allows the subscriber to communicate directly with advertisers that advertise goods or services of particular interest.

One embodiment of the method is an advertising method for a communication system that has a central station for allowing communication of a plurality of subscribers. The system has the ability for at least one subscriber to communicate with others, such as fellow subscribers, using a communication device of the communication system. A rate is established for the communication services provided to the subscriber. Advertisements are provided from at least one advertiser to at least one subscriber. Advertisers are charged for providing the service of delivering advertisements to the subscribers. The cost for subscribers who receive advertisements is reduced from the established rate.

In an embodiment, the communication system is wireless. In an embodiment, the wireless communication system is a cellular telephone system and the communication device is a cellular telephone.

In an embodiment, the system provides the ability for the at least one subscriber to reduce their cost for the communication services by increasing the opportunity to receive advertisements.

One method of providing the advertisements is as the ring tone. Another method of providing the advertisements is while the communication system is attempting to reach the other party. A third method of providing the advertisements is while the communication device of the communication system is disconnecting from the other party.

In an embodiment, the method has the ability for at least one subscriber to entirely subsidize the cost of the communication services by receiving a sufficient number of advertisements.

In an embodiment, the method has the ability for the at least one subscriber to reduce their cost for the communication service by agreeing to participate in at least one special program. One such special program is acceptance and use of a credit card wherein the transaction history of the credit card is used in determining what advertisements are forwarded to the at least one subscriber. Another such special program is a speakerphone broadcast wherein the advertisement is capable of being heard by persons near the communication device of the at least one subscriber. Another special program is the ability to purchase products directly from at least one of the advertisers by the at least one subscriber by taking a step while the advertisement is playing or displayed.

In an embodiment, the method has the ability for the at least one subscriber to adjust the amount of advertisement received. In an embodiment, the communication system allows adjusting the amount of advertisement received by allowing the at least one subscriber to postpone at least one advertisement by so indicating on the communication device. In an embodiment, the communication system allows adjusting the amount of advertisement received by allowing the at least one subscriber to turn off the receiving of advertisements for a set period.

In an embodiment, the communication system allows adjusting the amount of advertisement received by allowing the at least one subscriber to retain and replay at least one advertisement. In an embodiment, the communication system allows adjusting the amount of advertisement received by allowing the at least one subscriber to request more information in association with at least one advertisement. In an embodiment, the communication system allows adjusting the amount of advertisement received by allowing the at least one subscriber to contact the advertiser associated with at least one advertisement.

In an embodiment of the advertising method, the system provides the ability to adjust the advertising received by the at least one subscriber based on a subscriber profile. The subscriber profile can include the subscriber's stated preferences. The subscriber profile can be updated in real time to include the current location of the communication device. The subscriber profile can include information on call patterns including type and location of businesses contacted. The subscriber profile can include information collected from a credit card associated with the subscriber including location and type of purchases.

In an embodiment of the advertising method, the system provides advertisements from at least one advertiser to at least one subscriber including providing the at least one subscriber opportunities associated with at least one advertisement. In an embodiment, the opportunity is in the form of a coupon displayable on and readable on the communication device.

In an embodiment of the advertising method, the communication system is wireless and the communication device is a personal digital assistant (PDA). In an embodiment of the advertising method, the communication system is a land line phone service. In an embodiment of the advertising method, the communication system is a voice over internet protocol (VoIP) telephone system. In an embodiment of the advertising method, the communication system is a satellite system.

An embodiment of a communication system includes at least one central station, a plurality of substations connected to the at least one central station, and a plurality of communication devices capable of communicating with at least one of the plurality of the substations. A subscriber database includes a third party available portion. The database includes subscriber profiles. The system includes an advertising database and a mechanism for prioritizing advertisements for forwarding to communication devices based on the subscriber profile of at least one subscriber.

In an embodiment, the plurality of substations are cells and the communication devices are cellular telephones. Each cell corresponds to a geographic area and has a cell transceiver in communication with the central station and the cellular telephone.

In an embodiment, the communication system includes an opportunity notification system technology system which controls the subscriber database, the advertising database, and the mechanism for prioritizing advertisements. The opportunity notification system updates the profiles of the subscribers in real time and has a predictive index to suggest future buying habits.

A method for generating revenue by targeting advertisements on a communication system includes providing a communication system for use by a plurality of subscribers and providing the ability for at least one subscriber to communicate with others using a communication device of the communication system. A rate is established for the communication services provided to the subscriber. Advertisements are provided from at least one advertiser to at least one subscriber. The advertiser is charged for providing the service of delivering advertisements to at least one subscriber. The cost to the subscriber who received advertisements is reduced from the established rate. The system provides the ability to adjust the advertising received by the subscriber based on a subscriber profile. In addition, the system provides the ability for the at least one subscriber to adjust the amount of advertisement received.

In one embodiment, the subscriber profile is updated in real time. The subscriber profile includes information collected from a credit card associated with the subscriber including location and type of purchases.

In one embodiment, the system provides advertisements from the advertiser to the subscriber including providing the at least subscriber opportunities associated with at least one advertisement. In one embodiment, the communication system is a wireless cellular telephone system and the communication device is a cellular telephone.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

An advertising system and method for a communication system that delivers advertisements to subscribers based on the respective subscriber data. The advertisers through the provider of the system have advertisements selected and delivered to the subscriber based on the subscriber data. The advertiser pays for advertisement delivery such that the provider can offer reduced rates or free communication services to the subscribers. The provider is capable through the system to update the subscriber data including personal profile, purchase history, financial condition, and location in real time. The provider through the system is capable of establishing advertisement delivery priority by evaluating the subscriber data in real time just prior to triggering advertisement delivery. The advertisement can be delivered in place of ring tones, at the end of the conversation, and while awaiting the other party to answer.

Figure 1:
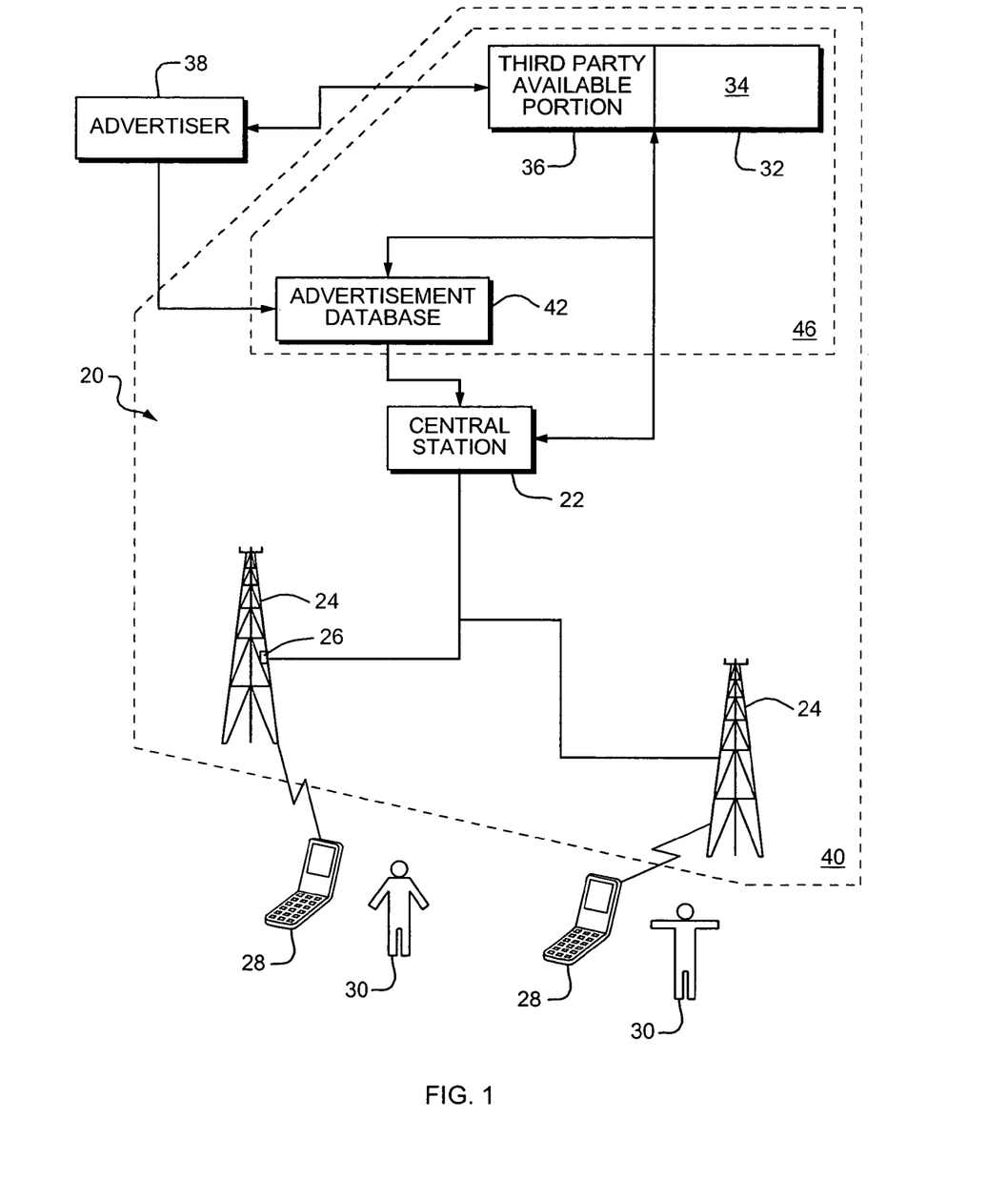
FIG. 1 is a schematic showing a cellular telephone system, according to one embodiment of the present invention.

Referring to FIG. 1, a schematic view of a cellular telephone system 20 is shown. The cellular telephone system 20 has a central station 22 connected to a plurality of cells 24.

Each of the cells 24 corresponds to a geographic area and has a cell transceiver 26 that is in communication with the central station 22. Each of the cells 24 are capable of communicating with a plurality of cellular telephones 28 that are owned or leased by a variety of subscribers 30. The cell 24 that communicates with the cellular telephone 28 depends on the location of both.

There are various techniques or communication systems used by various wireless providers including time division multiple access (TDMA), co-division multiple access (CDMA), and global system for mobile communications (GSM). In all the systems, the system 20 has methods of identifying which cellular telephone 28 is in communication with the cellular telephone system 20.

Still referring to FIG. 1, the cellular telephone system 20 has a subscriber database 32 connected to the central station 22, the subscriber database 32 includes information regarding the particular cellular telephone 28 and associated subscriber 30. The information included in the subscriber database 32 can include the plan, associated numbers including account numbers and telephone numbers, user profile, and financial data derived from a provider 40 sponsored credit card and/or other financial services as well as subscriber defined preferences. Subscriber preferences allow the subscriber 30 to define areas of real interest aimed at soliciting opportunity notification alerts (ONA) from advertisers 38 such as services suppliers, retailers or categories of retailers whose products the subscriber 30 has expressed a high interest in purchasing. The subscriber database 32 has two portions including a private portion 34 and a third party available portion 36. The third party available portion 36 provides information regarding subscribers including user profile data, product categorizing of purchasing history, and defined preferences. However, the third party available portion 36 does not include information such as user's name or specific street addresses. As indicated below, the subscriber 30 might elect to provide personal information to the advertisers 38.

Advertisers 38, which are not part of the cellular telephone system 20, have access to the third party portion 36 to determine criteria that they will use in forwarding advertisements to a provider 40. The provider 40, represented by the dash line, controls the cellular telephone system 20, including the central station 22, with the cells 24 and the subscriber database 32. In addition, the provider 40 has an advertisement database 42. The advertisers 38 submit advertisements for the advertising database 42 with specific criteria related to transmission.

The system 20 has an opportunity notification technology (ON-TEC) operating system 46 that includes the subscriber database 32 and the advertisement database 42. The ON-TEC system 46, as explained below, prioritizes the advertisements to deliver to a specific subscriber 30 from the advertisement database based on information in the subscriber database 32.

Figure 2:
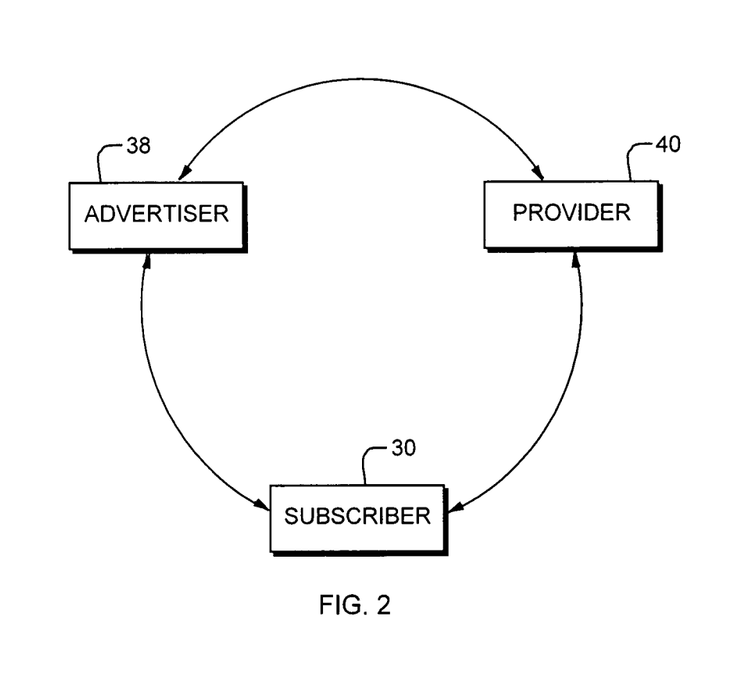
FIG. 2 is a simple schematic showing the relationship between the subscriber, the provider, and the advertiser.

Referring to FIG. 2, a simple schematic showing the relationship between the subscriber 30, the provider 40, and the advertiser 38 is shown. The provider 40 is providing a communication service to the subscriber 30 in a network to allow the subscriber 30 to communicate with others. Likewise, the provider 40 is providing a service to the advertiser 38 in providing a system 20 for which the advertiser 38 can place advertisements that are directed to the proper subscriber 30 as described below.

The advertiser 38 through advertisements and opportunities provides information regarding goods and services to the subscriber 30. In addition, as part of the subscriber accepting this information in the form of advertisement, the advertiser 38 agrees to pay some or all of the subscriber's 30 costs related to the wireless communication service through payment to the provider 40. In return, the subscriber 30 will patronize the establishments of these advertisers 38 therein justifying the advertisers 38 use of the system described below.

Figure 3:
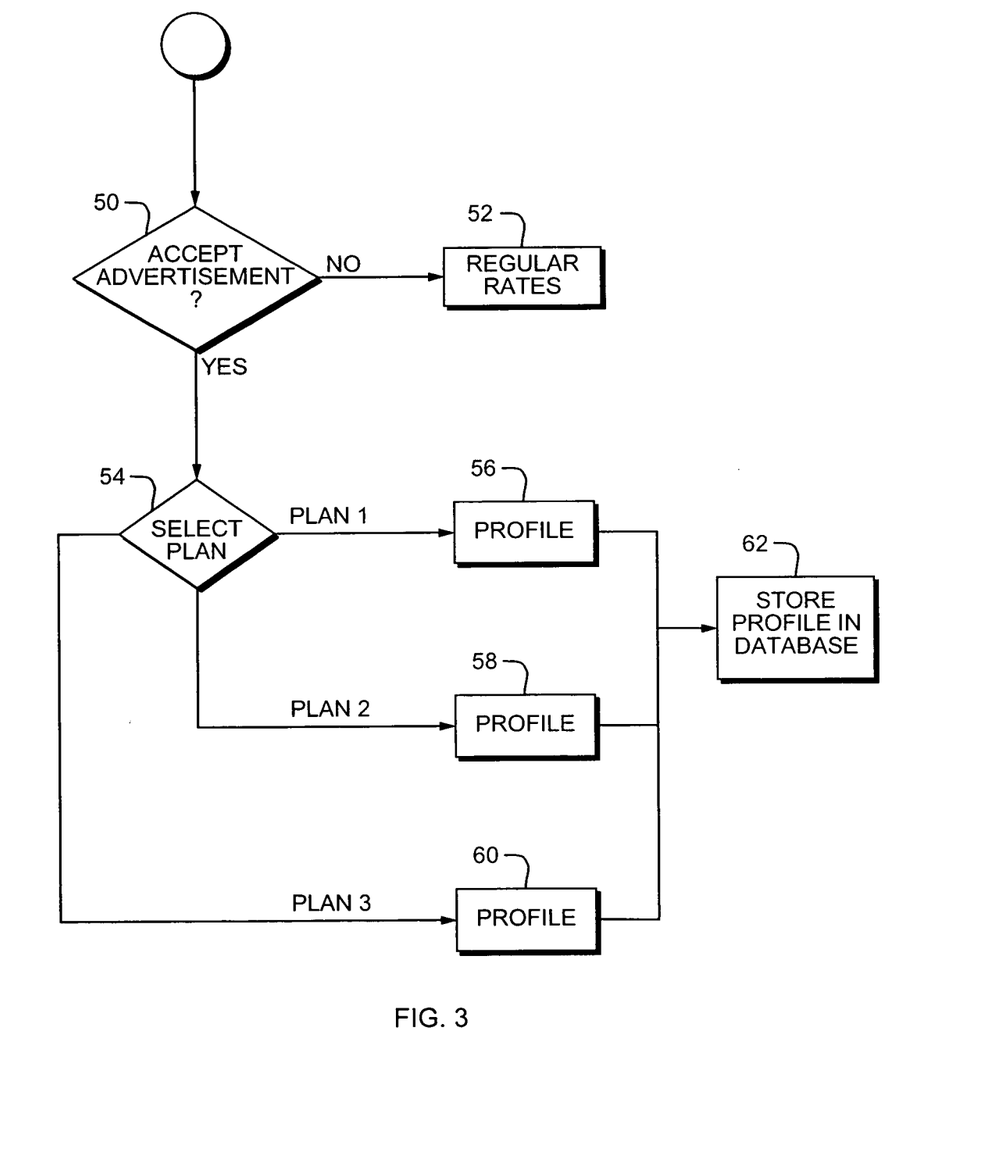
FIG. 3 is a schematic showing some of the potential decisions of one of the subscribers.

Referring to FIG. 3, a schematic showing some potential decisions one of the subscribers 30 can make is shown. A subscriber 30 upon signing up for service through the provider 40 for the communication service such as the wireless service needs to determine if they are willing to receive advertisements as part of the service. If the subscriber 30 decides not to take advertisements as shown by the "no" branch from the decision diamond 50, the subscriber pays regular rates as represented by block 52. If the subscriber decides to accept advertisements as part of their service as represented by the "yes" branch of the decision diamond 50, the subscriber may have the option to select from multiple types of plans as represented by the decision diamond 54. Depending on the plan chosen as represented by the "1" branch, "2" branch, and "3" branch, the subscriber will need to provide certain information in the form of a profile. The information can include such things such as age, gender, interest, annual income, marital status, sports preferences, clothing preferences, etc. Subscriber 30 must develop and maintain an "Active Customer Profile" (ACP) which will identify all likes, dislikes, and monthly needs.

As part of the "Active Customer Profile" (ACP) the provider 40 offers a credit card to the subscriber 30. Through the use of a credit card, the provider 40 or an associated third party that manages the credit card is able to track type of purchases, time period between purchases and other trends. For example, the provider 40 from analysis of data can determine that a particular individual frequents grocery stores on Thursdays; therefore advertisers 38 will desire to direct advertisement on related products for late Wednesday or early Thursday. Furthermore, in that the ACP updates in real time, the ON-TEC system 46 could remove advertisements related to groceries as soon as the credit card is recorded as being used in that type of store. Another example is the provider 40 determines from analysis of data that an individual purchases running shoes every four (4) months. The system 46 could direct related advertisement starting a few weeks prior to the projected date of the next purchase. Likewise, if the subscriber 30 did not indicate an interest in music in the survey form and the credit card records likewise indicate no purchases, an advertiser 38 would not want to queue advertisements related to music to such a subscriber 30. The provider 40 can charge a higher rates for advertisements to the advertisers 38 because of the profiling and triggering of the advertisements.

The types of plans available to a subscriber as represented by branches "1," "2," and "3" from decision diamond 54 may vary depending on the subscriber's location, the type of phone the subscriber has, and financial information. For example, in a highly urban area, the provider 40 may have more types of plans than it does in a rural area. In addition, if the subscriber 30 has a cellular telephone 28 which does not have a speaker function, options may include directing the advertisement over the phone's earpiece to both the caller and the subscriber (dual play option) before a direct line is open allowing them to communicate or allowing subscriber 30 to select a plan that charges a higher rate. Likewise, if the capability of the video screen is minimal, other options may be not possible. In addition, the type of plan could be dependent on credit rating and spending habits. A subscriber 30 with a better credit rating and at a certain amount of spending per month may qualify for certain plan. Once the subscriber 30 has decided on a plan at decision diamond 54 and filled out the associated profile 56, 58, or 60, the profile is saved by the provider 40 in the subscriber database 32, as shown in FIG. 1, and represented by block 62 in FIG. 3.

Figure 4A:
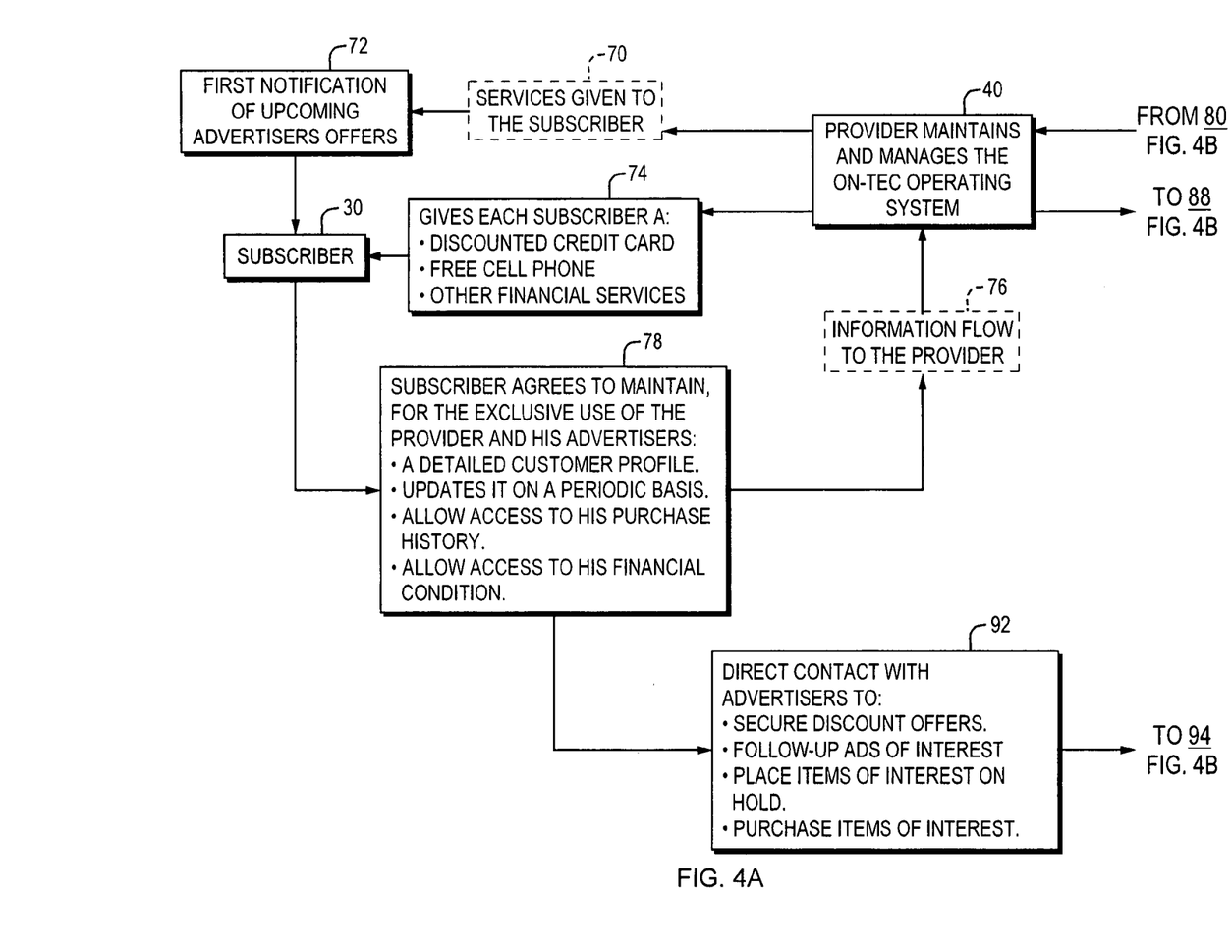
FIGS. 4A and 4B is a schematic showing the relationship between the subscriber, the provider, and the advertiser.
Figure 4B:
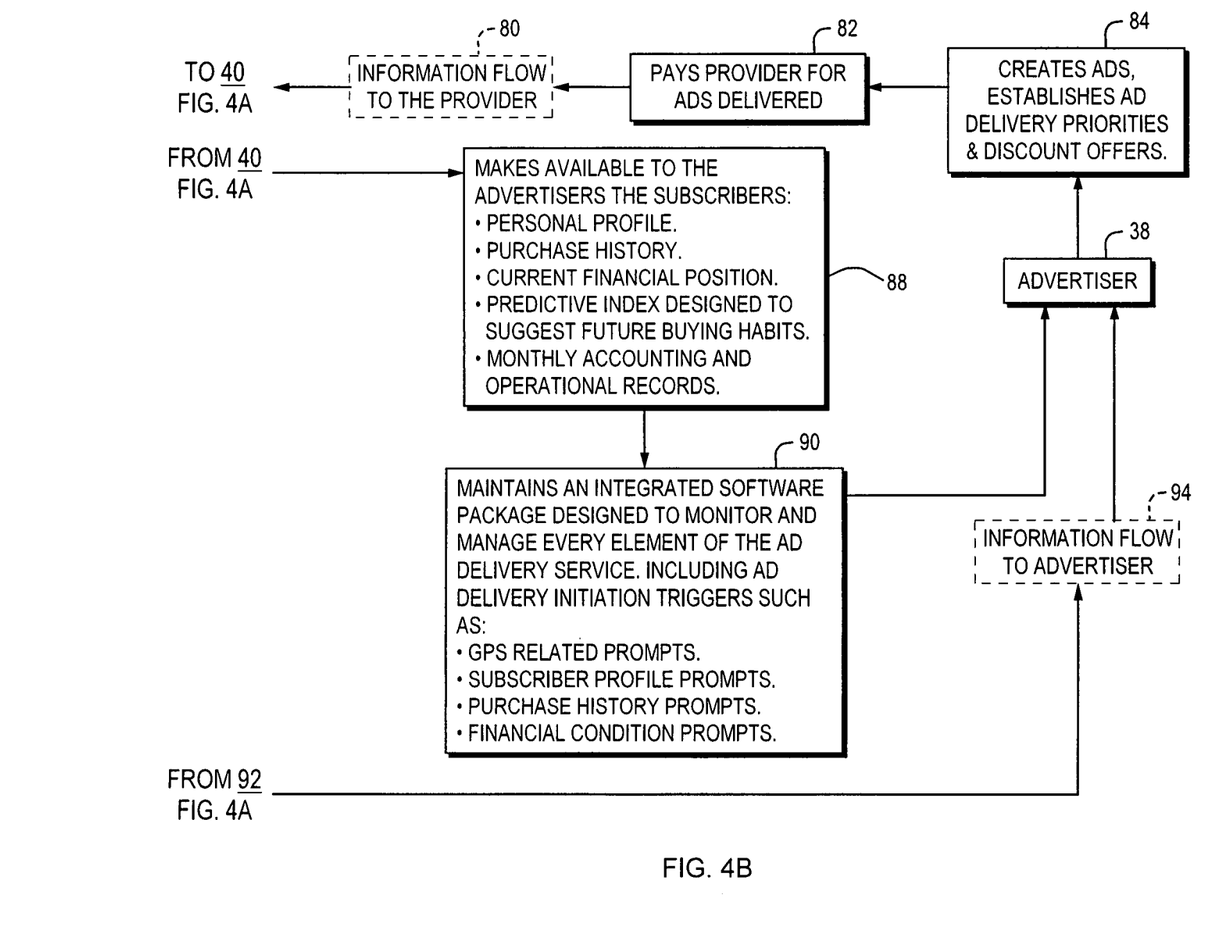

Referring to FIGS. 4A and 4B, a schematic providing more detail than FIG. 2 of the relationship between the subscriber 30, the provider 40, and the advertiser 38 is shown. While the provider 40 operates the communication system 20, the advertisers 38 and the subscribers 30 interact with the communication system 20 to benefit all. The communication system 20 has the opportunity notification technology (ON-TEC) operating system 46. FIGS. 4A and 4B shows benefits and agreements the parties, the provider 40, the advertisers 38, and the subscriber 30 may agree to for the communication system 20 with the ON-TEC system 46 to benefit of all. It is recognized that the parties may not agree to all elements mentioned with respect to these FIGS. Furthermore, there may be additional items, some of which are discussed below with respect to other FIGS.

The provider 40 provides the subscriber 30 communication services as represented by block 70. In addition, the provider 40 as the operator of the communication system 20 pushes the advertisements including notification of advertisers offers, "opportunities," as represented by block 72. In addition, the provider 40 can provide the subscriber 30 additional items in addition to reduced rates for the service. This items as represented by block 74 can include a credit card, which will be discussed in further detail below; completely free service through accepting certain elements of a plan; and other financial services.

Still referring to FIGS. 4A and 4B, the subscriber 30 in order to receive the benefit of the reduced rate or free communication services agrees to provide information to the provider 40, as represented by block 76. The subscriber 30 in selecting a plan, such as represented by plan 1, plan 2, or plan 3 in FIG. 3 agrees to provide or grant access to certain information. The items as represented by block 78 can include detailed customer profile, an "Active Customer Profile" (ACP), and updated periodically, access to purchase history and financial information.

The advertiser 38 provides information and other items to the provider 40 as represented by block 80. This includes the advertiser 38 paying the provider 40 for delivering advertisements as represented by block 82 which subsidizes the cost of the communication service for the subscriber 30. In addition the advertiser 38 needs to have advertisements created as represented by block 84. The advertisements, as represented by block 84, include creating advertisements, establishing of advertisement priorities, and providing discount offers.

Still referring to FIGS. 4A and 4B, one major benefit the provider 40 imparts to the advertiser 38 is details on the subscribers, as represented by block 88, in order to allow the advertiser 38 to better target the advertisements. The provider 40 can convey various amounts of information related to the subscribers 30 based on what the advertiser 38 is paying per advertisement. The information can be based on the profile including the subscriber's personal profile, the subscriber's purchase history, the subscriber's financial history and call history. In addition, the provider 40 can convey predictive indexing information designed to suggest future buying habits.

Another element of the ON-TEC system 46 of the communication system 20 is that it allows the subscriber 30 the option to provide specific information regarding them self to the advertiser 38 for the purpose of receiving a benefit as represented by block 92. For example the subscriber 30 can secure discount offers, follow-up related to advertisement of interest, place items of interest on hold, or purchase an item of interest. This and other information flows to the advertiser 38 from the subscriber 30 as reflected by block 94.

Figure 5A:
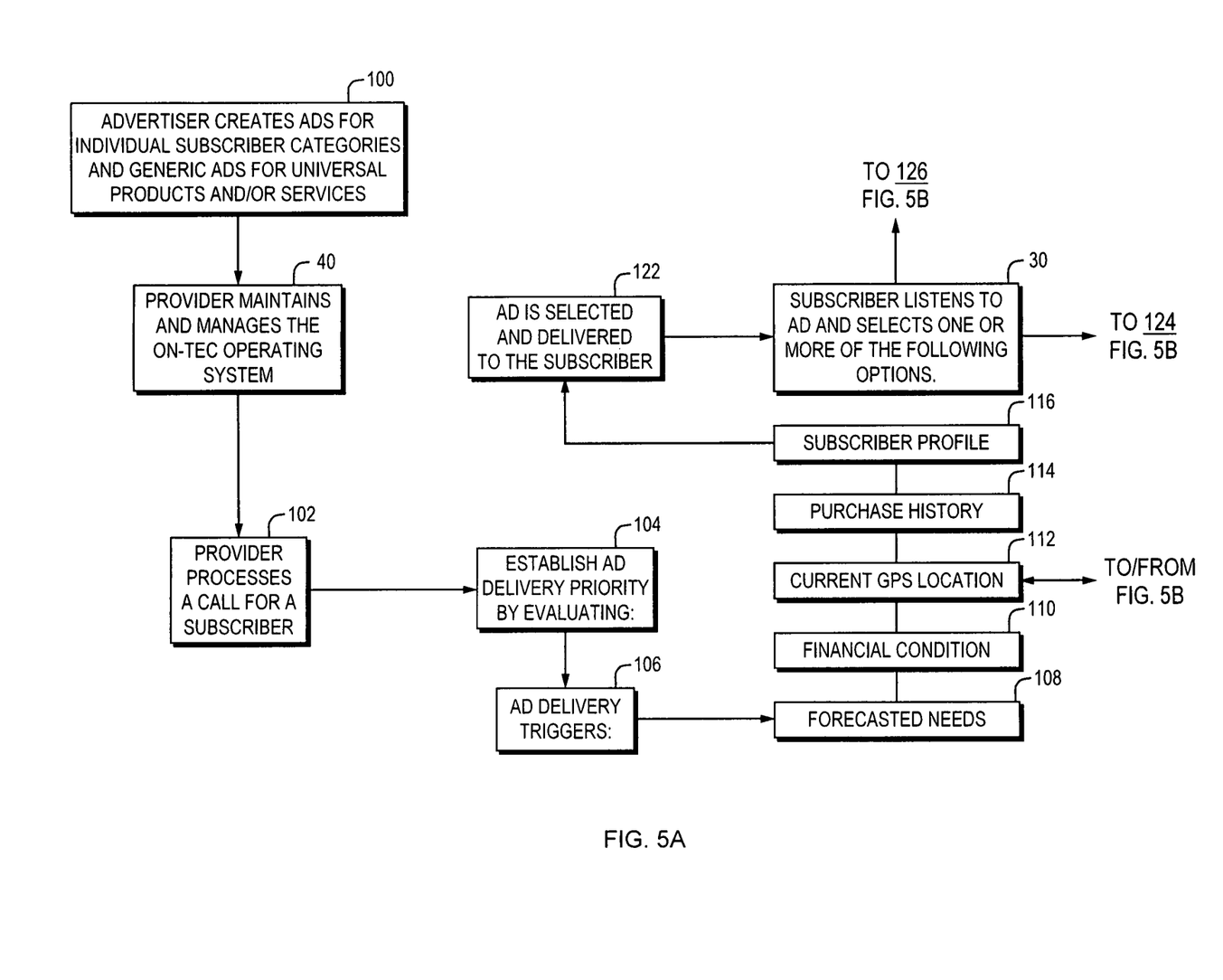
FIGS. 5A and 5B is a schematic showing a basic advertisement delivery triggering system.
Figure 5B:
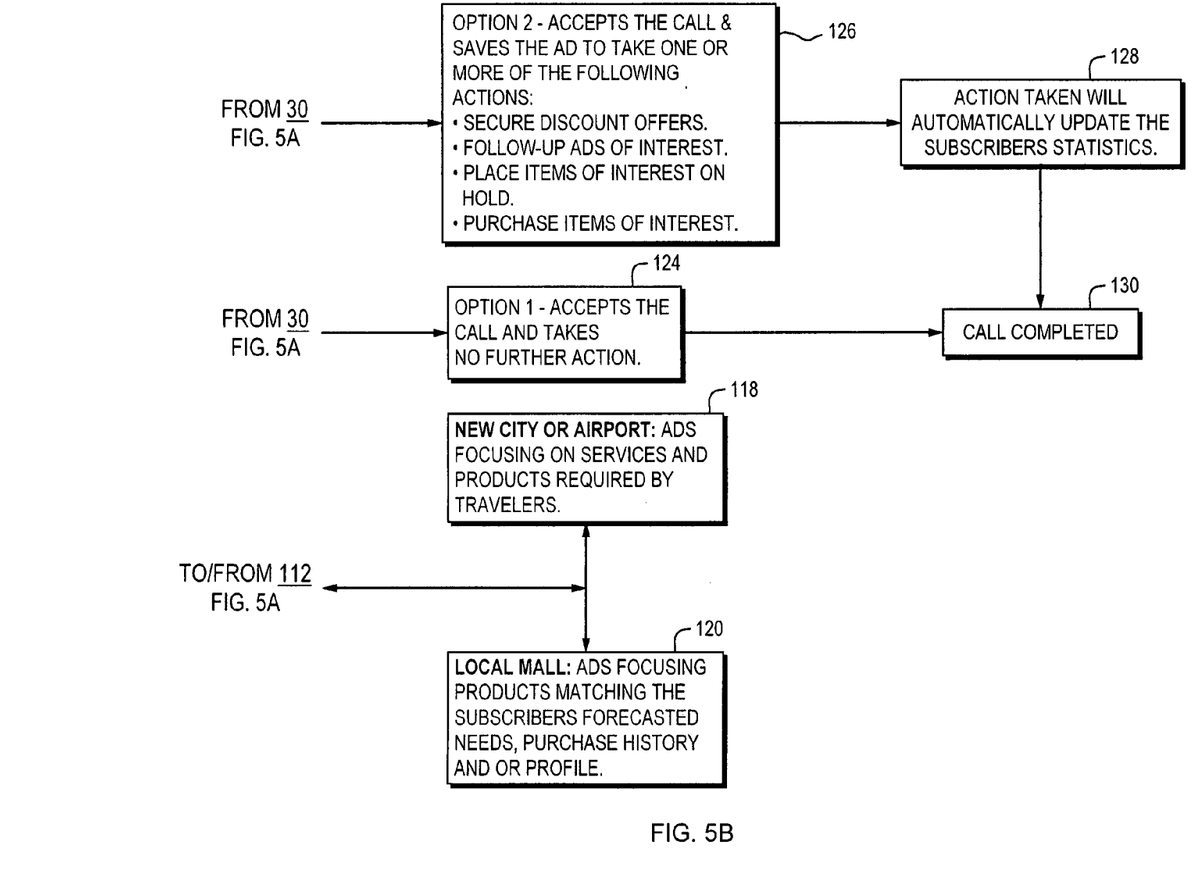

The provider 40 based on information provided by the subscribers 30 and data gathered related to the subscribers 30 as described above with respect to FIGS. 4A and 4B and in particular block 78 can convey to the advertisers 38 detailed information as represented by blocks 88 and 90 in FIGS. 4A and 4B related to specific details/demographics related to the subscribers 30. Referring to FIGS. 5A and 5B, a schematic of a basic advertisement delivery triggering system is shown. The advertiser 38 creates advertisements for both specific categories and generic advertisements, as represented by block 100. The advertiser 38 gives the advertisements to the provider 40 for forwarding to the subscriber 30. In order to maximize benefit for all parties, the provider 40 prioritizes the advertisements that the subscriber 30 receives using the ON-TEC system 46, as represented by block 104. By prioritizing the advertisements, the subscriber 30 receives advertisements that are relevant to the particular subscriber 30. The advertiser 38 is able to target the advertisements better and therefore convert more advertising to purchases. The provider 40 by increasing return on investment for the advertiser 38 is able to charge the advertiser 38 higher rates and at the same time get more subscribers 30.

Still referring to FIGS. 5A and 5B, the process of delivering the advertisement begins with the provider 40 processing a call for a subscriber 30 as represented by block 102. While the term "call" is used, it is recognized that it could be other types of communication such as text, video, etc. When the advertisement delivery is triggered as represented by block 106, the provider 40 through the ON-TEC system 46 looks at several factors in order to determine the appropriate advertisement to be selected. Blocks 108-116 represent some of the factors that can be examined.

Block 108 represents inputting into the factoring of the advertisement selected the needs that are forecasted for that particular subscriber 30. The needs could vary and could include that the subscriber shops for groceries on Thursdays so relevant advertisements are pushed on Thursday mornings or that the subscriber 30 purchases running shoes every four months and therefore running shoe and related advertisements are pushed near that time period and not right after the shoes are purchased. In addition, it could be pushing advertisements related to vehicles when the amount the subscriber 30 spends on automobile repairs reaches a certain dollar amount in a set period.

Block 110 represents inputting into the factoring of the selecting of the advertisement based on the subscriber's 30 financial condition. If the subscriber 30 is a college student with no major assets, the ON-TEC system 46 will likely not send advertisement for luxury items having values in the tens of thousands, but relevant items a "poor college student.".

Block 112 represents inputting into the factoring of the selecting of the advertisement based on the subscriber's current location. As indicated above, the ON-TEC system 46 updates in real time. Therefore, if the subscriber 30 has flow from one city to another, the ON-TEC system 46 can select advertisements relevant to the new city. The ON-TEC system 46 determines unit location by what cells 24, as seen in FIG. 1, to which the cellular telephone 28 is connected. In addition, the information could come directly from GPS information from the cellular telephone 28. Block 118 represents a new city or airport and advertisements focusing on services and products required by subscriber 30 as a traveler. Likewise, block 120 represents advertisements being selected based on being near a location in the subscriber's 30 own town, such as a local mall. The advertisement is likely based on additional factors listed in blocks 108-116. For example, related to a new city in block 118, if the subscriber's purchase history 114 provides information on when the subscriber 30 is scheduled to leave town (i.e., when a flight is booked to departure), the ON-TEC system 46 can prioritize advertisement for events that will occur when the subscriber 30 is in the particular town.

Block 114 represents inputting into the factoring of selecting of the advertisement based on the subscriber's purchase history. If the subscriber 30 elects a plan that gives the subscriber 30 a credit card that allows the provider 40 or associated third party access to the subscriber's 30 purchase history, the advertisement can targeted to be on items or services the subscriber has already purchased and would likely purchase again or related items. For example, if the subscriber 30 purchases a trip to a resort, the advertisements could be geared to clothing, accessories, and gear that might be appropriate for that location, or travel related products. Likewise, if the subscriber 30 purchases golf clubs, the advertisements could be related to golf courses or other equipment related to the sport.

Block 116 represents inputting into the factoring of selecting of the advertisement based on the subscriber's profile, the "Active Customer Profile.". The subscriber 30, regardless of the plan selected, in one embodiment is required to complete a profile (ACP) related to them self. The profile can include information related to age, income, marital status, and number and ages of children. In addition, it can include information related to hobbies and occupation. The profile could also request birth dates and therefore forward advertisements and opportunities at the subscriber or an associate of the subscriber's birthday. For example, the ON-TEC system 46 could deliver advertisements related to the subscriber's spouse's interests shortly before the spouse's birthday.

Still referring to FIGS. 5A and 5B, block 122 represents the advertisement is selected based on the factors, such as represented in blocks 108-116, and delivered to the subscriber 30. The subscriber 30 is presented several options by the ON-TEC system 46. One option as represented by block 124 is simply to listen or view the advertisement and continue with normal actions. For example, if the advertisement occurs as a ring tone, the subscriber 30 answers the telephone call. If the advertisement occurs after the subscriber 30 disconnects from the call, the subscriber 30 may hear the advertisement from the speaker on the cellular telephone 28 as the subscriber 30 returns the telephone 28 to where the subscriber 30 normally retains their telephone 28.

Another option as represented by block 126 is to save the advertisement in order to take further action later. At a later time, the subscriber 30 may review the advertisement again or take further action as represented by block 92 in FIGS. 4A and 4B. An action that the subscriber 30 takes will be used to update the subscriber's profile as represented by block 128. Block 130 represents the cellular telephone 28 in its standby position after the completion of the call and any advertisements.

Figure 6:
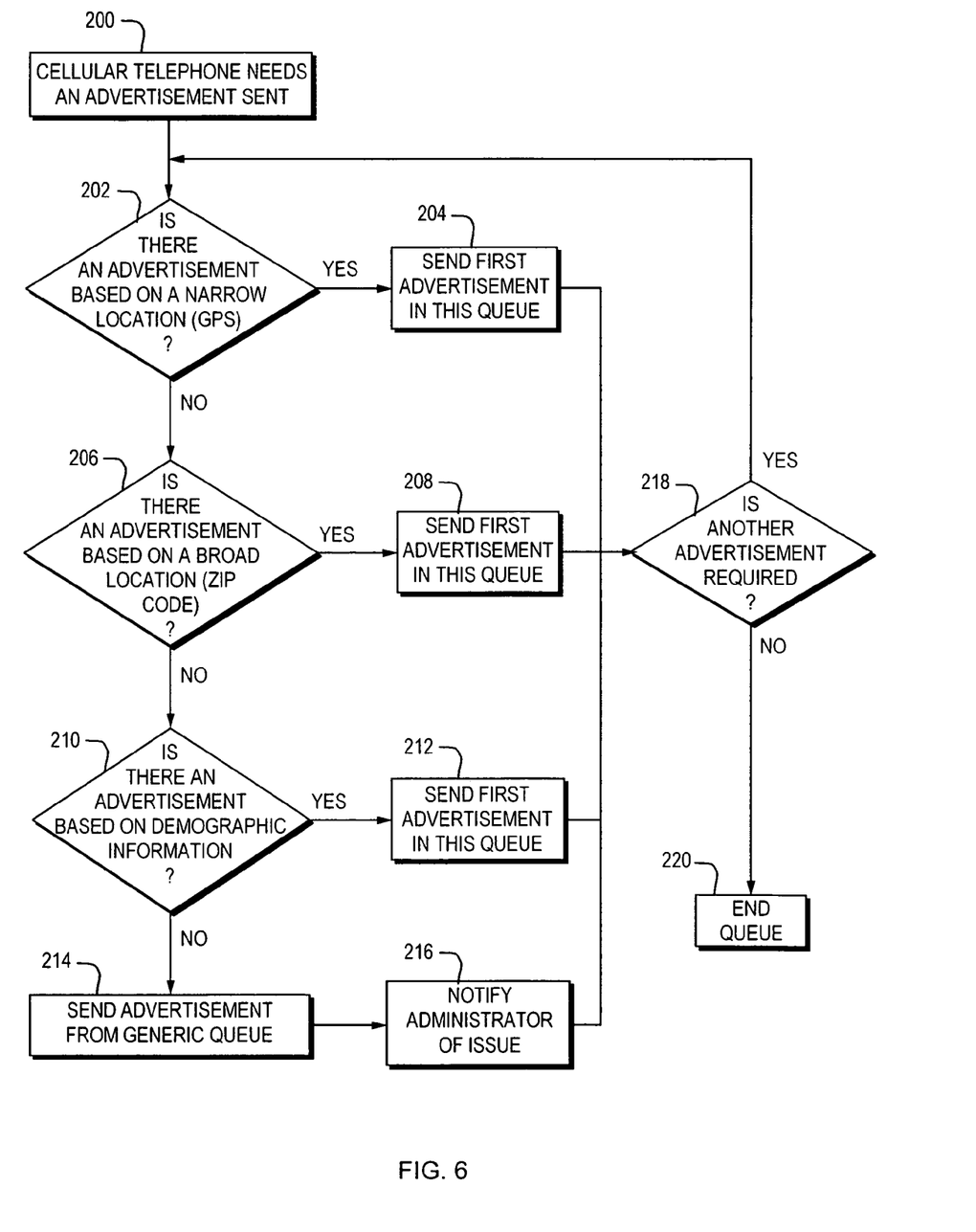
FIG. 6 is a schematic showing the queuing of advertisements for a subscriber.

Referring to FIG. 6, a schematic showing the queuing of advertisements for a subscriber 30 is shown. The advertising method of the cellular telephone system 20 will typically have numerous types of advertisements that are appropriate for a particular subscriber 30. The system 20 will determine which advertisement the subscriber 30 receives when an advertisement is appropriate to be sent to the subscriber as discussed above with respect to FIG. 4. When something has transpired regarding this cellular telephone 28 such as turning on the phone, dialing, receiving a call, transitioning to another cell tower area, or updating of the subscriber's profile, the system 20 will determine what advertisement to send to the cellular telephone 28. As indicated above, the profile is updated in real time based on one or more factors including factors such as subscriber 30 inputs, charges to credit card, and location.

Referring to FIG. 6, when it is to determined that a cellular telephone 28 needs an advertisement sent as represented by box 200, the first decision the system 20 makes is if there is an advertisement based on a narrow location as represented by decision diamond 202. A narrow location could be that determined by global position system (GPS) of the cellular telephone 28 or the cell 24 to which the telephone 28 is connected. The criteria could be within a certain block, mile, five (5) miles of a certain location. If the answer is yes as represented by the "yes" branch of the decision diamond 202, the first advertisement in this queue as represented by box 204 is sent to the cellular telephone 28

If the answer is no, the "no" branch from decision diamond 202 is followed to the next question of whether there is an advertisement based on a broad location occasion such as a zip code as represented by decision diamond 206. If the answer is yes as represented by the "yes" branch of the decision diamond 206, the first advertisement in this queue, as represented by block 208 is sent. While two decision diamonds 202 and 206 are shown, it is recognized that a multiple of decisions diamonds could exist based on varying criteria including varying distance and organized to offer subscriber's 30 an intuitive ad service designed to anticipate both current and future needs based on the subscribers 30 stated preferences, current location, call history, purchasing history, and profile to name just a few.

If the answer is no, as represented by the "no" branch of the decision diamond 206, the next question is if there is an advertisement based on demographic information provided by the subscriber 30 in their profile, as represented by decision diamond 210. If the answer is yes, then the information from this queue is sent as represented by box 212. If the answer is no, as represented by the "no" branch of the decision diamond 210, generic information is sent as represented by box 214. In addition, if generic information is sent, the administrator is notified of the issue as represented by box 216 to determine if there are some issues related to the user's profile.

After the advertisement is sent to the telephone as represented by blocks 204, 208, 212 or 216, the next decision as represented by decision diamond 218 is if another advertisement is required. If the answer is yes as represented by the "yes" branch from the decision diamond 218, the flow chart returns back to the first decision diamond 202. If the answer is no as represented by the "no" branch from the decision diamond 218, the process is ended as represented by box 220. It is recognized that FIG. 6 shows just one of many styles of decision trees that can be used with the communication system 20 with the ON-TEC system 46.

The above embodiment has been described related to a system for delivering advertisements to wireless communication devices (WCD's) in particular cellular telephones. The advertisement can take many forms including audio, text, graphical, and audiovisual advertisement. The system of the present invention integrates a method of incentivizing users to listen to such advertisements; a method of ensuring each advertiser that its' advertisement is delivered to the target recipient as intended; a method of choosing the advertisements to be delivered to a given individual to target the individual's needs or interests; and a method of allowing the user to communicate directly with an advertiser. The system of the present invention is designed to facilitate and coordinate the business and economic needs of users, advertisers, and service providers, offering each the incentive necessary to justify their participation.

With respect to the incentive for listening to an advertisement delivered to a communication device such as a cellular telephone, the subscriber 30 in one embodiment will purchase "air time" for the communication device, either from a network service provider or a third-party intermediary, free or at a significant discount to the otherwise usual cost of such time if the user agrees to receive advertisements. The subscriber 30 can also be given the option, for less of a discount, to skip any advertisement the subscriber 30 desires. The skipping of the advertisement could be by pushing a button just prior to dialing a call. Another method could be to turn off advertisement for a set period of time like 15 minutes, an hour, a half a day. The system 20 could also be set up to not provide additional advertisements if the subscriber 30 is attempting to redial a number that the subscriber had attempted to reach in a previous time period. Skipping an advertisement can also lead to an additional reduction in discount or loss of opportunities.

In an embodiment, short advertisements can be delivered to, and played by communication devices such as a cellular telephone 28 when the device is turned on or in place of ring tones or dialing tones. Large advertisements can be delivered to, and played by, the device at the end of a call, during the shut down phase, or when the device is turned off. The system can be set-up such that the advertisements cannot be deferred by the subscriber or if deferred, the next time the subscriber will hear/see additional advertisement before their "call" is connected. An advertisement can be personalized by including the subscriber's user's name or other personal information in it.

An advertisement can be played on the communication device's speakerphone to reach a peripheral audience in addition to the subscriber. As indicated above, advertisements of particular interest can be replayed by activating the communication device's recall feature within a prescribed amount of time after the advertisement is first played. Likewise the advertisement can be stored for replay. Also, an advertisement can include a toll free direct dial prompt for more information on the advertised product or service, or to place an item on hold, or to purchase an item of interest. Each of these actions can be performed through the use of the communication device's keyboard or through the use of voice commands.

With respect to choosing the advertisement to be delivered to the communication device, as indicated above with respect to FIGS. 4A and 4B, the subscriber 30 will receive a better rate and possible free communication services by providing additional personal information. This information can include providing basic demographic information, such as age, gender, and interests, upon first purchasing air time. In addition, the subscriber 30 in certain plans must agree to allow both his calling history and the communication device's location at any given time to be monitored, recorded, and used to select advertisements to be delivered to subscriber's device. The location monitoring can be done by noting the zip code in which the device is activated or by the use of GPS technology. Users are provided with a service designed to anticipate both current and future needs based on their demographics, stated preferences, current location, and calling history.

In a preferred embodiment of the present invention, a cellular telephone call to an airline from a wireless cellular device (WCD) can be used to trigger the delivery to that WCD of advertisements for other travel related goods and services.

In addition, a new activation of a WCD in a particular zip code can trigger the delivery of advertisements for goods or services provided in that zip code. Also, the GPS technology within most WCD's can be used to trigger advertisements for goods or services provided in a smaller geographic area.

In yet another preferred embodiment, advertisements to be sent to a WCD can be queued-up in an order determined by the urgency of the advertisement. For example, advertisements triggered by the GPS determined location of the WCD can be more urgent than advertisements triggered by the first activation of the WCD in a new zip code, which can, in turn, be more urgent than advertisements based on demographic information of the WCD user.

Advertisers will be charged for delivery of their ads. In another preferred embodiment, the rates are dependent on a number of factors, including the length of an advertisement, whether it is audio, visual, or audiovisual, the number of times it is delivered, and the extent to which demographic, calling history, a user's stated preference, zip code, or GPS information is used to select an advertisement.

In another preferred embodiment of the present invention, an advertiser receives real time updates of a user's profile and a forecast of the subscriber's 30 upcoming buying needs based on her/his purchase history. The updates allow the advertiser to successfully target specific needs or interests of users.

In another preferred embodiment of the present invention, a service provider receives an operating system and software designed to queue-up and deliver targeted advertisements to users while maintaining, directing, and coordinating all accounting records and user data for the purpose of billing or of maintaining and enhancing the statistical data for each user.

The present invention is a system for delivering advertisements to all subscriber based systems, including without limitation conventional telephone service, cable service, and satellite receiving service. It includes the delivery of an audio, visual, or audiovisual advertisement. The system of the present invention integrates a method of incentivizing users to listen to such advertisements; a method of choosing the advertisements to be delivered to a user, a method of targeting a user's needs or interests; and a method of allowing the user to communicate directly with an advertiser.

While FIG. 1 shows a cellular telephone, the system could be used for other devices including but not limited to satellite systems, voice over internet protocol (VoIP) telephone systems, land line phones, and personal digital assistant (PDA).

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

It is recognized that in some embodiments, the muting of the speakerphone related to advertisements could result in automatically redirecting the advertisements to play over the communication device ear piece of both the subscriber and the party with whom the subscriber is going to communicate before a direct line is open allowing the parties to communicate.

It is recognized that the provider 40 in conjunction with the advertiser 38 can download special offer coupons directly to the subscriber's device. Coupons may be coded (visual bar code that can be scanned off the devices screen, IR pulse, tone code, etc.) to facilitate the use. This could allow the advertiser immediate product feedback and valuable market research data. The delivery of a coupon to the device may be triggered by the subscriber's proximity to the advertiser's location as determined by the device's GPS unit.

It is recognized that the system allows for the development of advertisements that are targeted only to customers who meet a very rigid, predetermined profile and/or in a predefined buying zone.

It is recognized that the ON-TEC system would allow the provider 40 to bill subscribers 30 for calls that are not in the plan or violate the plan/contract. For example, it is contemplated international calls would not be free in most plans. Likewise excess use may result in a charge to the subscriber.

What is claimed is:

1. An advertising method for a communication system comprising:
    providing a central station wherein the central station enables communication between a plurality of subscribers within a communication system, and the subscriber pays a provider to be connected to a wireless communication device;
    providing the ability for at least one subscriber to communicate with others using a communication device of the communication system;
    establishing a rate for the communication services provided to the subscriber, wherein the rate comprises the amount paid by the subscriber to the provider;
    providing advertisements on the communication device from at least one advertiser to at least one subscriber;
    charging the at least one advertiser for providing the service of delivering advertisements to at least one subscriber to the communication system; and
    reducing the cost from the established rate to the at least one subscriber to the communication system that received the advertisements on the communication device.

2. The advertising method for a communication system of claim 1, wherein the communication system is wireless.

3. The advertising method for a communication system of claim 2, wherein the wireless communication system is a cellular telephone system and the communication device is a cellular telephone.

4. The advertising method for a communication system of claim 1, further comprising the step of providing the ability for the at least one subscriber to reduce their cost for the communication services by increasing the opportunity to receive advertisements.

5. The advertising, method for a communication system of claim 4, wherein one method of providing the advertisement is as the ring tone.

6. The advertising method for a communication system of claim 4, wherein one method of providing the advertisement is while the communication system is attempting to reach the other party.

7. The advertising method for a communication system of claim 4, wherein one method of providing the advertisement is while the communication device of the communication system is disconnecting from the other party.

8. The advertising method for a communication system of claim 1, further comprising the step of providing the ability for the at least one subscriber to entirely subsidize the cost of the communication services by receiving a sufficient number of advertisements.

9. The advertising method for a communication system of claim 1, further comprising the step of providing the ability for the at least one subscriber to reduce their cost for the communication service by agreeing to participate in at least one special program.

10. The advertising method for a communication system of claim 9, wherein one of the special programs is a credit card wherein the transaction history of the credit card is used in determining what advertisements are forwarded to the at least one subscriber.

11. The advertising method for a communication system of claim 9, wherein one of the special programs is speakerphone broadcast wherein the advertisement is capable of being heard by persons near the communication device of the at least one subscriber.

12. The advertising method for a communication system of claim 9, wherein one of the special programs is the ability to purchase products directly from the at least one advertiser by the at least one subscriber by taking a step while the advertisement plays.

13. The advertising method for a communication system of claim 1, further comprising the step of providing the ability for the at least one subscriber to adjust the amount of advertisements received.

14. The advertising method for a communication system of claim 13, wherein the communication system allows adjusting the amount of advertisement received by allowing the at least one subscriber to postpone at least one advertisement by so indicating on the communication device.

15. The advertising method for a communication system of claim 13, wherein the communication system allows adjusting the amount of advertisement received by allowing the at least one subscriber to turn off the receiving of advertisements for a set period.

16. The advertising method for a communication system of claim 13, wherein the communication system adjusting the amount of advertisement received by allowing the at least one subscriber to retain and replay at least one advertisement.

17. The advertising method for a communication system of claim 13, wherein the communication system allows adjusting the amount of advertisement received by allowing the at least one subscriber to request more information in association with at least one advertisement.

18. The advertising method for a communication system of claim 13, wherein the communication system allows adjusting the amount of advertisement received, by allowing, the at least one subscriber to contact the advertiser associated with at least one advertisement.

19. The advertising, method for a communication system of claim 1, further comprising the step of providing the ability to adjust the advertising received by the at least one subscriber based on a subscriber profile.

20. The advertising method for a communication system of claim 19, wherein the subscriber profile includes the subscriber's stated preferences.

21. The advertising, method for a communication system of claim 19, wherein the subscriber profile is updated in real time to include the current location of the communication device.

22. The advertising method for a communication system of claim 19, wherein the subscriber profile includes information on call patterns including type and location of business contacted.

23. The advertising method for a communication system of claim 19, wherein the subscriber profile includes information collected from a credit card associated with the subscriber including location and type of purchases.

24. The advertising method for a communication system of claim 19, wherein the subscriber profile is updated in real time.

25. The advertising method for a communication system of claim 1, wherein providing advertisements from the at least one advertiser to the at least one subscriber includes providing the at least one subscriber opportunities associated with at least one advertisement.

26. The advertising method for a communication system of claim 25, wherein the opportunity is in the form of a coupon displayable on and readable on the communication device.

27. The advertising method for a communication system of claim 1, wherein the communication system is wireless and the communication device is a personal digital assistant (PDA).

28. The advertising method for a communication system of claim 1, wherein the communication system is a land line phone service.

29. The advertising method for a communication system of claim 1, wherein the communication system is a voice over internet protocol (VoIP) telephone system.

30. The advertising method for a communication system of claim 1, wherein the communication system is a satellite system.

31. A method for generating revenue by targeting advertisements on a communication system comprising:
   providing a communication system for use by a plurality of subscribers, wherein the subscriber pays a provider to be connected to a wireless communication device;
   providing the ability for at least one subscriber to communicate with others using the communication device of the communication system;
   establishing a rate for the communication services provided to the subscriber, wherein the rate comprises the amount paid by the subscriber to the provider;
   providing advertisements on the communication device from at least one advertiser to at least one subscriber;
   charging the at least advertiser for providing the service delivering advertisements to at least one subscribe to the communication system;
   reducing the cost from the established rate to the at least one subscriber to the communication system that received advertisements on the communication device;
   providing the ability to adjust the advertising receive on the communication device by the at least one subscriber based on a subscriber profile; and
   providing the ability for the at least one subscribe to adjust the amount of advertisement received on the communication device.

32. The method for generating revenue by targeting advertisements on a communication system of claim 31, wherein the subscriber profile is updated in real time.

33. The method for generating revenue by targeting advertisements on a communication system of claim 32, wherein the subscriber profile includes information collected from a credit card associated with the subscriber including location and type of purchases.

34. The method for generating revenue by targeting advertisements on a communication system of claim 33, wherein the providing of advertisements from the at least one advertiser to the at least one subscriber includes providing the at least one subscriber opportunities associated with at least one advertisement.

35. The method for generating revenue by targeting advertisements on a communication system of claim 34, wherein the communication system is a wireless cellular telephone system and the communication device is a cellular telephone.

* * * * *